United States Patent Office 3,469,386
Patented Sept. 30, 1969

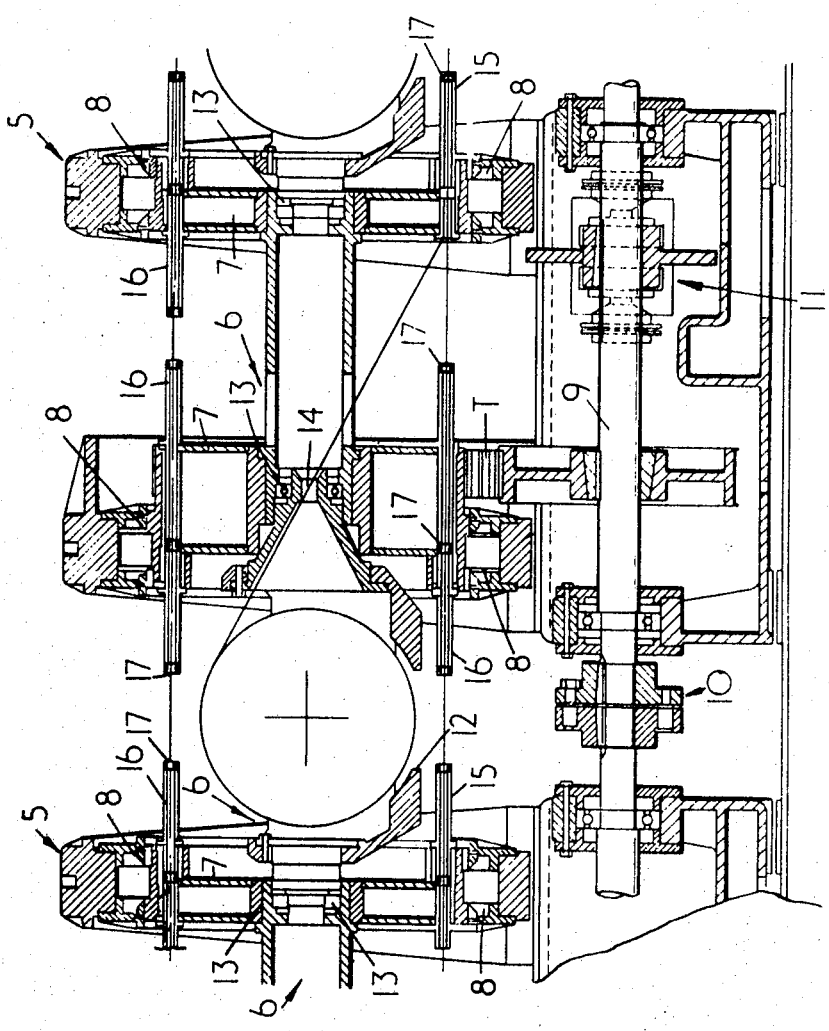

3,469,386
STRANDING MACHINES
Samuel McGonigal, Benllech, Anglesey, Wales, assignor to Barcro-Olympic Stranders Limited, Eastleigh, Hampshire, England, a British company
Filed May 20, 1968, Ser. No. 730,361
Claims priority, application Great Britain, May 19, 1967, 23,463/67
Int. Cl. D01h 7/90; D07b 3/04
U.S. Cl. 57—58.36          7 Claims

ABSTRACT OF THE DISCLOSURE

A wire stranding machine including a series of independent and coaxially aligned heads, with each head having a rotatable carrier section, cradles for supporting wire supply bobbins and extending therebetween and being supported in bearings on the rotatable carrier sections of adjacent heads, means for transmitting a drive to each carrier section such that the carrier sections are rotatable synchronously, a brake in each head for arresting rotational movement of the rotatable carrier section thereof, and wire guide means at the periphery of each head in the form of forwardly and rearwardly extending tubes.

---

This invention relates to stranding machines and relates particularly to an improvement in or modification of the stranding machine disclosed in Patent No. 3,271,942, issued Sept. 13, 1966, to V. P. Griffin.

In our aforesaid patent, there is disclosed a stranding machine including a series of independent and co-axially aligned heads, each having a rotatable carrier section, cradles for supporting wire-supply bobbins and extending between and being supported in bearings on the rotatable carrier sections of adjacent heads, means for transmitting a drive to each carrier section such that the carrier sections are rotatable synchronously, a brake in each head for arresting rotational movement of the rotatable carrier section thereof, and wire guide means at or adjacent the rotational axis and the periphery of each rotatable carrier section.

The present invention is concerned with the wire guide means of the above stranding machine. The wire guide means consist specifically of a wire guide at the rotational axis of each cradle and a wire guide at the perimeter of each carrier section, with a number of angularly-spaced guide openings also being provided around the perimeter of each carrier section such that the wire from each bobbin passes firstly through the cradle wire guide thence outwardly to the perimeter wire guide and thereafter follows a straight-line path through succeeding guide openings parallel to the machine axis until all the wires are brought together at a twist plate in a setting device.

Experience has shown that, due to the high speeds at which the stranding machine operates, the wires being guided tend to bow and there is a build up of inertia in the wires leading to high centrifugal forces which frequently result in breaking of the wires. This is obviously disadvantageous in that it necessitates stoppage of the machine with a loss of production. It is also dangerous for the operators.

A solution to this problem is to increase the support of the wires at the perimeter wire guide and guide openings of each carrier section, and it is an object of the present invention to provide a simple and effective solution.

According to the present invention, therefore, the improvement in or modification of the stranding machine disclosed in Patent No. 3,271,942 consists in providing the wire guide means at the periphery of each rotatable carrier section in the form of guide arms extending axially of the machine and projecting from each carrier section towards the adjacent carrier section, whereby outward bowing movement of the wires is prevented.

The guide arms are preferably in the form of tubes and the guide tubes of adjacent carrier sections may be separate or interconnected.

An embodiment of the present invention will now be described, by way of example, with reference to the accompanying drawing which is a fragmentary sectional view of two heads of our stranding machine.

The stranding machine is fully described and illustrated in the specification and drawings of the aforesaid patent and therefore, for the sake of simplicity, only those parts required for an understanding of the present invention will be described.

Briefly, the stranding machine consists of a series of independent heads 5 (only two of which are shown) which are axially aligned and which have, as is customary, at one end, a pay-out device (not shown) for a core wire, and, at the other end, a setting device and take-up mechanism (also not shown). Each head 5 save the first and last is identical with the others, with the first and last heads being, in effect, half heads.

Each head 5 comprises an H-shaped carrier rotor 6, of which large-diameter ends 7 are supported in large-diameter bearings 8, and a drive shaft 9 below the rotor 6 drivingly connected thereto by a timing belt T. The drive shafts 9 are coupled as indicated at 10 to form a sectionalized drive shaft which is driven by a motor (not shown) so that all the heads rotate in synchronism. Each drive shaft 9 mounts a disc brake 11, with all the brakes 11 being synchronously operable.

A wire bobbin-supporting cradle 12 is supported between adjacent carrier rotors 6 in bearings 13.

Each cradle 12 has, at its forward end, i.e. that end nearer the setting device, a wire guide 14, and each carrier rotor 6 has, on its large-diameter end nearer the setting device at the perimeter thereof, a wire guide. Wire guide openings are also spaced angularly around the large-diameter ends 7 of each carrier rotor 6 at the perimeters thereof, with all the perimeter wire guides and guide openings being in alignment to provide straight line paths for the wires parallel to the machine axis.

In accordance with the present invention, each perimeter wire guide is constituted by a tube 15 extending axially of the machine and projecting forwardly of the large-diameter end 7 towards the next carrier rotor 6. Each perimeter guide opening is constituted by a tube 16 extending axially of the machine and projecting both forwardly and rearwardly of each large-diameter end 7 of each carrier rotor 6.

The adjacent ends of adjacent guide tubes 15 and 16 are spaced from each other but are fairly close together. For example, the spacing between tubes 15 and 16 and 16 and 16 of adjacent carrier rotors 6 may be, say, 7¼ inches, while the spacing between the adjacent ends of the adjacent tubes 16 within each carrier rotor 6 may be, say 3½ inches save for that between a guide opening tube 16 and a wire guide tube 15 where the spacing may be, say, 9 inches.

The guide tubes 15 and 16 are provided internally with suitable wire guiding surfaces 17.

It will be manifest that due to the provision of the guide tubes 15 and 16, the length of wire unsupported through the stranding machine is substantially reduced thus eliminating any tendency to bowing and considerable reducing centrifugal forces in the wire. Consequently, wire breakage is very substantially reduced.

It is envisaged that the projecting end of each guide tube 15 may be connected to the guide tubes 16 aligned therewith, with the aligned guide tubes 16 also being interconnected so that there are extending axially of the machine a series of long guide tubes interconnecting the successive heads 5.

Alternatively, the adjacent guide tubes 15 and 16 of adjacent carrier rotors are spaced as aforesaid, while the aligned guide tubes 16 carried by the large diameter ends 7 of each carrer rotor 6 are interconnected.

Instead of tubes, the wire guides may be in the form of bars or plates of straight or arcuate cross-section having eyelets or similar connectors to their undersurfaces, with the wires passing through the eyelets or similar connectors and abutting against the bars or plates thereby eliminating bowing.

What is claimed is:

1. A wire stranding machine comprising a series of independent and coaxially aligned heads, each head having a rotatable carrier section, cradles for supporting wire-supply bobbins and extending between and being supported in bearings on the rotatable carrier sections of adjacent heads, means for transmitting a drive to each carrier section such that the carrier sections are rotatable synchronously, a brake in each head for arresting rotational movement of the rotatable carrier section thereof, and wire guide means, the improvement comprising providing said wire guide means, at the periphery of each rotatable carrier section in the form of guide arms extending axially of the machine and projecting from each carrier section towards the adjacent carrier section, whereby outward bowing movement of the wires is prevented.

2. The stranding machine as claimed in claim 1, in which the guide arms are in the form of tubes.

3. The stranding machine as claimed in claim 2, in which each rotatable carrier section is of H configuration with the wire guide tubes being supported in the large-diameter ends thereof.

4. The stranding machine as claimed in claim 3, in which each rotatable carrier section has a wire guide tube in one large-diameter end adapted to receive the wire from the wire guide at the rotational axis of the carrier section, with this wire guide projecting only towards the succeeding carrier section, while the remaining guide tubes of each carrier section project forwardly and rearwardly of the large-diameter ends.

5. The stranding machine as claimed in claim 4, in which the guide tubes projecting forwardly and rearwardly of the large-diameter ends of each carrier section and which are in axial alignment are interconnected between the large-diameter ends.

6. The stranding machine as claimed in claim 5, in which each guide tube which receives the wire from the guide means at the rotational axis of its carrier section is connected to the aligned succeeding guide tubes of succeeding carrier sections, with said succeeding guide tubes being also interconnected.

7. The stranding machine as claimed in claim 6, in which each guide tube is provided internally with wire guiding surfaces.

References Cited

UNITED STATES PATENTS

| | | | |
|---|---|---|---|
| 697,437 | 4/1902 | Boone | 57—58.36 |
| 2,162,131 | 6/1939 | Somerville | 57—58.32 |
| 2,534,696 | 12/1950 | Bruestle | 57—58.3 XR |
| 2,671,303 | 3/1954 | Pearce | 57—58.36 XR |
| 2,723,525 | 11/1955 | Blaisdell | 57—58.36 |
| 2,897,646 | 8/1959 | Simcoe et al. | 57—58.3 |
| 3,271,942 | 9/1966 | Griffin | 57—58.32 |

FOREIGN PATENTS 921,626  3/1963  Great Britain.

DONALD E. WATKINS, Primary Examiner